United States Patent
Saimoto et al.

(10) Patent No.: US 8,835,760 B2
(45) Date of Patent: Sep. 16, 2014

(54) ELECTRIC JUNCTION BOX

(71) Applicant: Yazaki Corporation, Tokyo (JP)

(72) Inventors: Tetsurou Saimoto, Shizuoka (JP);
Takahiro Iwaki, Shizuoka (JP);
Takafumi Toda, Shizuoka (JP);
Takeyuki Hamaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 7 days.

(21) Appl. No.: 13/864,800

(22) Filed: Apr. 17, 2013

(65) Prior Publication Data

US 2013/0280952 A1    Oct. 24, 2013

(30) Foreign Application Priority Data

Apr. 18, 2012 (JP) ................. 2012-094486

(51) Int. Cl.
*H02G 3/08* (2006.01)
*H01R 13/42* (2006.01)
*H01R 13/514* (2006.01)
*H01R 9/22* (2006.01)
*B60R 16/023* (2006.01)

(52) U.S. Cl.
CPC .............. *H01R 13/42* (2013.01); *H01R 13/514* (2013.01); *B60R 16/0238* (2013.01); *H01R 9/226* (2013.01)
USPC ............ 174/50; 174/559; 174/520; 439/76.1; 439/76.2; 439/527

(58) Field of Classification Search
USPC ........ 174/50, 559, 17 R, 520; 439/76.1, 76.2, 439/949, 404, 535, 527; 361/600, 601, 611, 361/679.01
See application file for complete search history.

(56) References Cited

U.S. PATENT DOCUMENTS

| | | | |
|---|---|---|---|
| 7,632,110 B2 * | 12/2009 | Kanou et al. .................. | 439/76.2 |
| 7,670,184 B2 * | 3/2010 | Akahori et al. ............... | 439/76.2 |
| 7,699,623 B2 * | 4/2010 | Yoshida et al. ............... | 439/76.2 |
| 7,785,116 B2 * | 8/2010 | Akahori et al. ............... | 439/76.2 |
| 7,893,364 B2 * | 2/2011 | Oda .............................. | 174/520 |
| 8,419,443 B2 * | 4/2013 | Kamo .......................... | 439/76.1 |
| 8,491,326 B2 * | 7/2013 | Sato et al. ..................... | 439/404 |
| 8,492,650 B2 * | 7/2013 | Nakayama et al. ............ | 174/50 |
| 8,633,383 B2 * | 1/2014 | Akahori et al. ................. | 174/50 |

FOREIGN PATENT DOCUMENTS

JP     2009-278800 A     11/2009

\* cited by examiner

*Primary Examiner* — Angel R Estrada
(74) *Attorney, Agent, or Firm* — Kenealy Vaidya LLP

(57) ABSTRACT

Disclosed is an electric junction box in which a pair of cassette blocks is arranged at intervals to each other in a component-attaching direction, capable of downsizing without increase of the number of component. The electric junction box comprises a pair of cassette blocks, configured to attach electric components thereto, arranged at intervals mutually in a component-attaching direction; and a cross-sectionally U-shaped bus bar attached to one cassette block, electrically connected to the electric components, a middle of the bus bar being arranged in a direction perpendicular to the component-attaching direction, both ends of the U-shaped bus bar being arranged in the component-attaching direction, wherein the electric components attached to the other cassette block are opposed to the middle of the bus bar.

8 Claims, 7 Drawing Sheets

ELECTRIC JUNCTION BOX

This application claims priority under 35 U.S.C. §119 to Japanese Patent Application No. JP2012-094486, filed Apr. 18, 2012, the entirety of which is incorporated by reference herein.

TECHNICAL FIELD

This invention relates to electric junction boxes employed for mutual connection with wire harnesses, particularly to electric junction boxes including a plurality of cassette blocks in which electric components are attached.

BACKGROUND ART

Various types of electric components are attached to automobiles. In order to supply power with, or transmit signals to these various types of electric components, the automobiles are provided with a plurality of wire harnesses that are wired therein, formed by bundling a plurality of electric wires. The automobiles are also provided with electric junction boxes that are placed at appropriate position employed for mutual connection of wire harnesses.

Known as one example for the above mentioned electric junction boxes is electric junction boxes including a pair of cassette blocks to which electric components are attached, and a case accommodating the pair of cassette blocks, and placed at intervals in a depth direction of the case (see PTL 1, for example).

CITATION LIST

Patent Literature

[PTL 1]
Japanese Patent Application Laid-Open Publication No. 2009-278800

SUMMARY OF INVENTION

Technical Problem

Disadvantageously, in order to prevent interference between electric wires attached to one of the pair of cassette blocks and the electric components attached to the other of the pair of cassette blocks in the above mentioned electric junction boxes, it is necessary to broaden an interval of the pair of cassette blocks or to use a cover for keeping away the electric wires, posing drawbacks of upsizing of the case or increase of the number of the electric components.

Therefore, an object of the invention is to provide an electric junction block in which a pair of cassette blocks is arranged mutually at intervals in a component-attaching direction, allowing downsizing without increasing the number of components.

Solution to Problem

According to a first aspect of the invention to achieve the above mentioned object, an electric junction box comprises: a pair of cassette blocks configured to attach electric components thereto, arranged at intervals to each other in a component-attaching direction; and a cross-sectionally U-shaped bus bar attached to one of the pair of cassette blocks, electrically connected to the electric components, and including a middle portion and both ends, wherein the middle portion of the bus bar is arranged in a direction perpendicular to the component-attaching direction, and both ends of the bus bar are arranged in the component-attaching direction, and wherein the electric components attached to the other of the pair of cassette blocks are opposed to the middle of the bus bar.

Preferably, the electric components connected to the bus bar in the one of the pair of cassette blocks are arranged in two lines.

Preferably, the electric junction box includes a plate disposed in the one or the other of the pair of cassette blocks, wherein the plate extends toward the other or the one of the pair of cassette blocks, and is provided with an engaging part for being engaged by the other or the one of the pair of cassette blocks.

Preferably, the one of the pair of cassette blocks is configured to attach a fuse thereto, wherein the other of the pair of cassette blocks is configured to attach a relay thereto, and wherein the relay is connected in series to the fuse.

Advantageous Effects of Invention

According to the first aspect of the invention, since the electric components attached to the other of the pair of cassette blocks opposes the middle of the bus bar, and the electric wire attached to the one of the pair of cassette blocks and the electric components attached to the other of the pair of cassette blocks are not opposed in the component-attaching direction, it is made possible to narrow the interval between the pair of cassette blocks, and thus to provide the electric junction block that becomes downsized without increase of the number of components.

Furthermore, according to the invention, since the electric junction box includes the plate in the one or the other of the pair of cassette blocks, extending toward the other or the one of the pair of cassette blocks, and the plate is provided with an attaching part for being attached to the other or the one of the pair of cassette blocks, it is made possible to provide the electric junction block capable of being readily assembled.

Furthermore, since it is possible to position closely the fuse attached to the one of the pair of cassette blocks and the relay attached to the other the pair of cassette blocks, it is made possible to shorten electric wire connecting the relay and the fuse.

DESCRIPTION OF EMBODIMENTS

An electric junction box according to the invention is described with reference to FIGS. 1 to 9.

An electric junction box 1 of the present invention is such as is installed in an automobile, thus supplying power with, or transmitting signal to electric devices installed in the automobile. Hereinafter, a junction block (or referred to as junction box), a fuse block (or referred to as fuse box), or relay block (or referred to as relay box) is generically referred to as an electric junction box.

Figure 1:
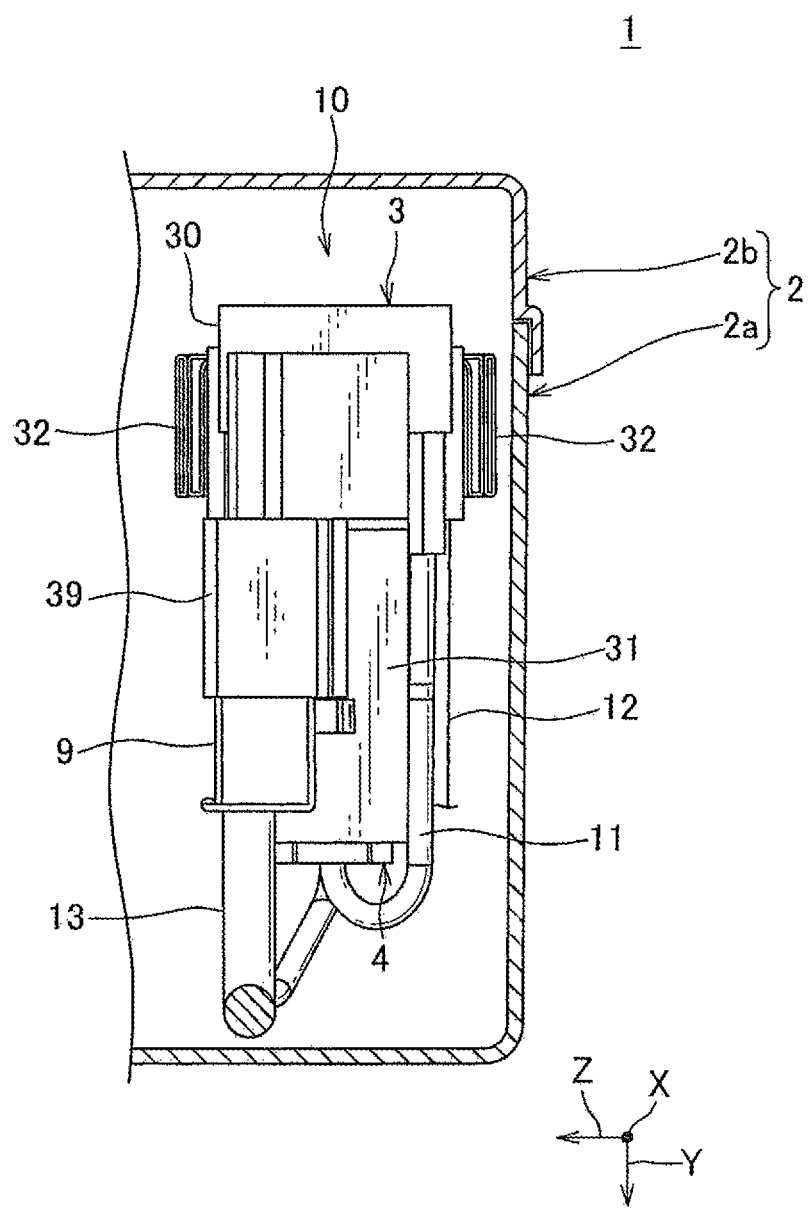
FIG. 1 is a cross-sectional view illustrating an electric junction box according to the first embodiment of the invention.

The above mentioned electric junction box is as shown in FIG. 1 includes a power source block 10 composed of a pair of cassette blocks 3, 4, and a case 2 accommodating the power source block 10. The case 2 is composed of box-like case main body 2a, a cover 2b covering an opening of the case main body 2b.

Figure 9:
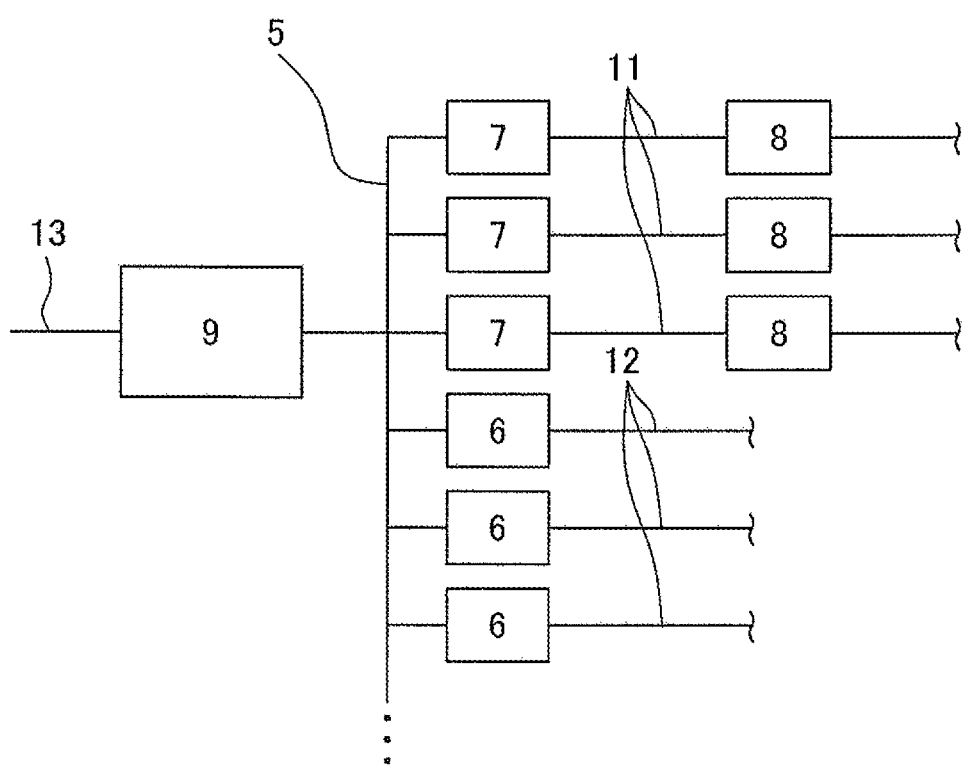
FIG. 9 is a schematic circuit diagram of the power source block illustrated in FIG. 1.

The above mentioned power source block 10 as shown in FIG. 9 supplies power, and is as shown in FIGS. 2 to 6 composed of a plurality of electric components 6, 7, and 8, a pair of cassette blocks 3, 4 to which these electric components 6, 7, 8 are attached, a bus bar 5 attached to one cassette block 3, and a plurality of electric wires 11, 12. Reference sign 13 represents an input power line, reference sign 9 a connector connected to an end of the input power line 13.

The above mentioned electric components 6, 7 are fuses, attached to the one of the pair of cassette blocks 3. The above mentioned electric component 8 is a micro relay, attached to the other of the pair of cassette blocks 4. An arrow Y in FIGS. 1 to 6 represents a component-attaching direction in which the fuses 6, 7 and the micro relay 8 are attached to the cassette blocks 3, 4, arrows X and Z perpendicular directions perpendicular to the component-attaching direction.

Figure 4:
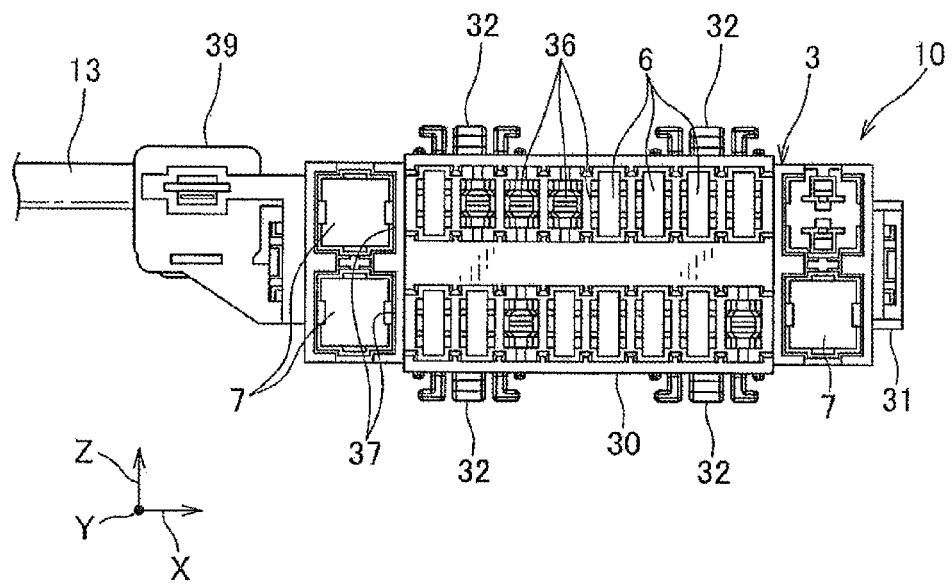
FIG. 4 is a plane view illustrating the power source block illustrated in FIG. 1.

The above mentioned cassette block 3 is formed of synthetic resin. The cassette block 3 is provided with an oblong main body 30, a connector engaging part 39 disposed at an end of the main body 30, four latches 32, and a pair of plates 31 disposed at both ends of the main body 30. The main body 30 is provided with a plurality of fuse attached parts 36, 37 to which the plurality of fuses 6, 7 are attached. The plurality of fuse attached parts 36, 37 is, as shown in FIG. 4, arranged in two lines. The connector engaging part 39 has the above mentioned connector 9 engaged therein. The four latches 32 are each latched onto not-shown latched parts disposed in the case main body 2a. The pair of plates 31 extends in a plate-like manner toward the other of the pair of cassette blocks 4. Tip of each of the plates 31 is provided with an engaging part 34 in which the other of pair of cassette blocks 4 is engaged.

The above mentioned cassette block 4 is formed of synthetic resin. The other of pair of cassette blocks 4 is provided with an oblong main body 40, and a pair of engagement receiving parts 43 disposed at both ends of the main body 40. The main body 40 is provided with a plurality of relay attached parts 48 to which the plurality of micro relays 8 is attached. The plurality of relay attached parts 48 is arranged in series. The pair of engagement receiving parts 43 is engaged in the engaging part 34 disposed in the pair of plates 31 of the one of the pair of cassette blocks 3 above mentioned.

Figure 6:
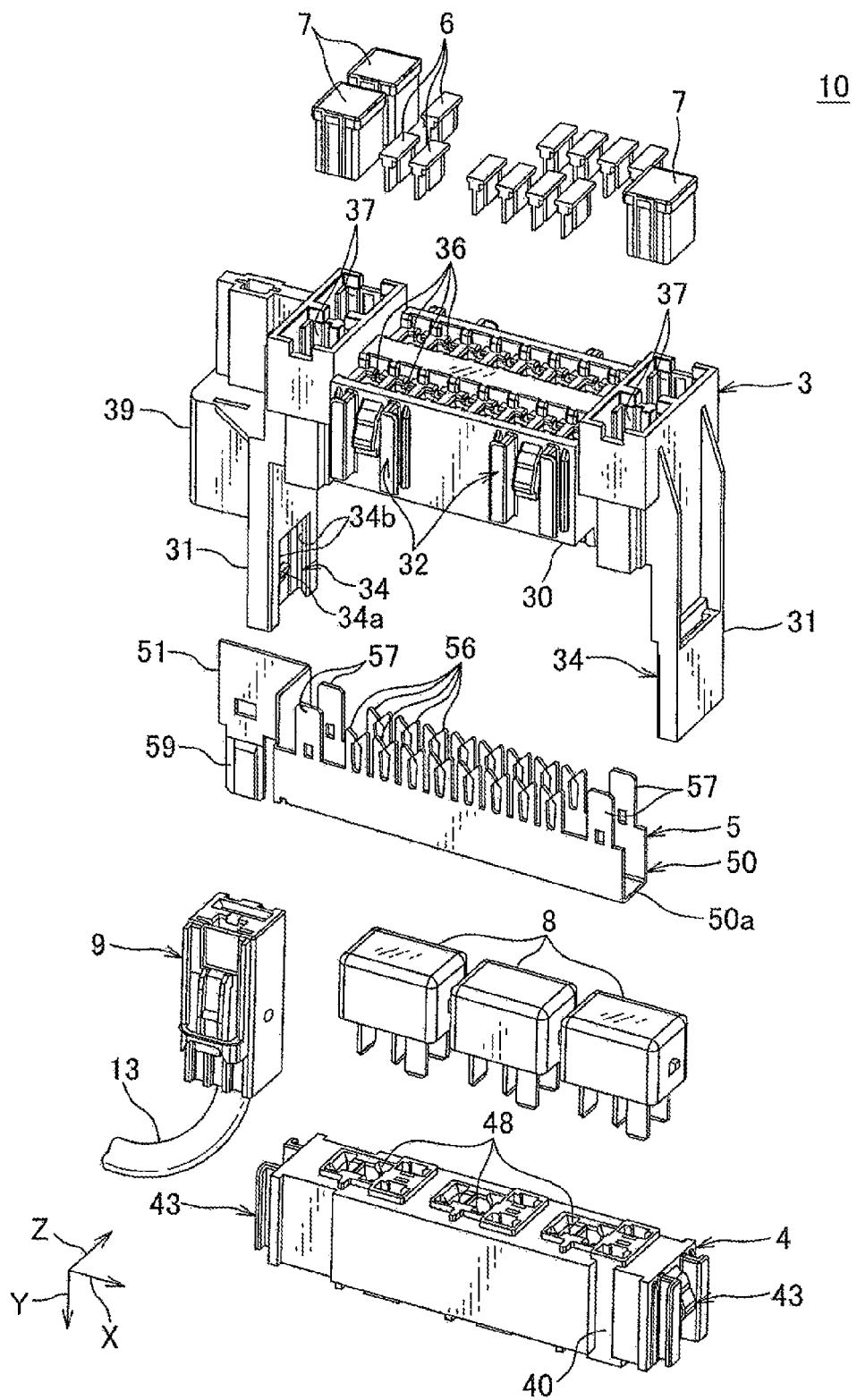
FIG. 6 is an exploded view illustrating the power source block illustrated in FIG. 1.
Figure 8:
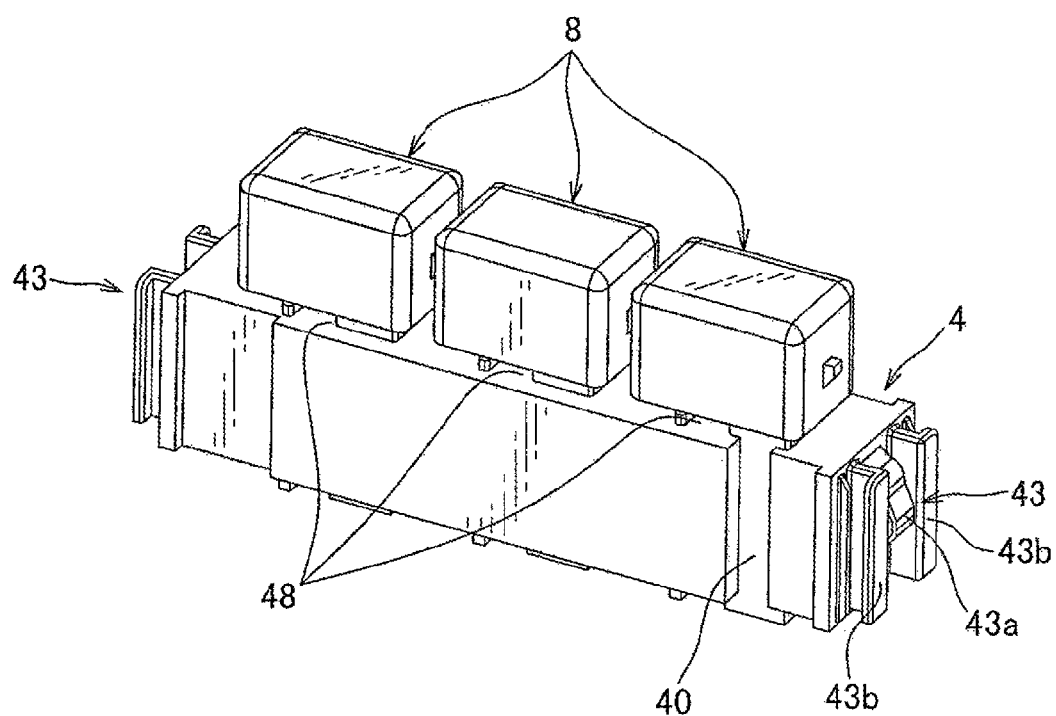
FIG. 8 is a perspective view illustrating the other of the first one of pair of cassette block composing the power source block illustrated in FIG. 1.

The engagement receiving parts 43 of the cassette block 4, as shown in FIG. 8, is composed of a projection 43a projecting from an outer surface of the main body 40, and a pair of rails 43b disposed at both sides of projection 43a. The engaging part 34 of the cassette block 3 is as shown in FIG. 6 composed of a projection 34a projecting from an inner surface of the plate 34b, and a pair of grooves 34b disposed at both sides of the projection 34a. The pair of rails 43b is inserted into the pair of grooves 34b and the projection 43a is engaged in the projection 34a, the engagement receiving parts 43 and the engaging part 34 are thus engaged to each other. Accordingly, engagement of the engagement receiving parts 43 and the engaging part 34 allows the pair of cassette blocks 3, 4 to separate to each other at intervals in the component-attaching direction to be fixed.

The above mentioned bus bar 5 is, as shown in FIG. 9, intended for distributing power inputted from the connector 9 to the plurality of fuse 6, 7, which is formed such as metal plate is pressed. This bus bar 5 is as shown in FIG. 6, provided with a base 50 bent into U-shape, a plurality of terminals 56, 57 extending from one end and the other end that oppose the base 50, a terminal 59 connected to the connector 9, and a connection part 51 connecting the terminal 59 and the base 50. The terminal 56 is formed into tuning-fork-like shape, and electrically connected to the fuse 6. The terminal 57 is formed into rectangular plate shape, electrically connected to the fuse 7.

Figure 7:
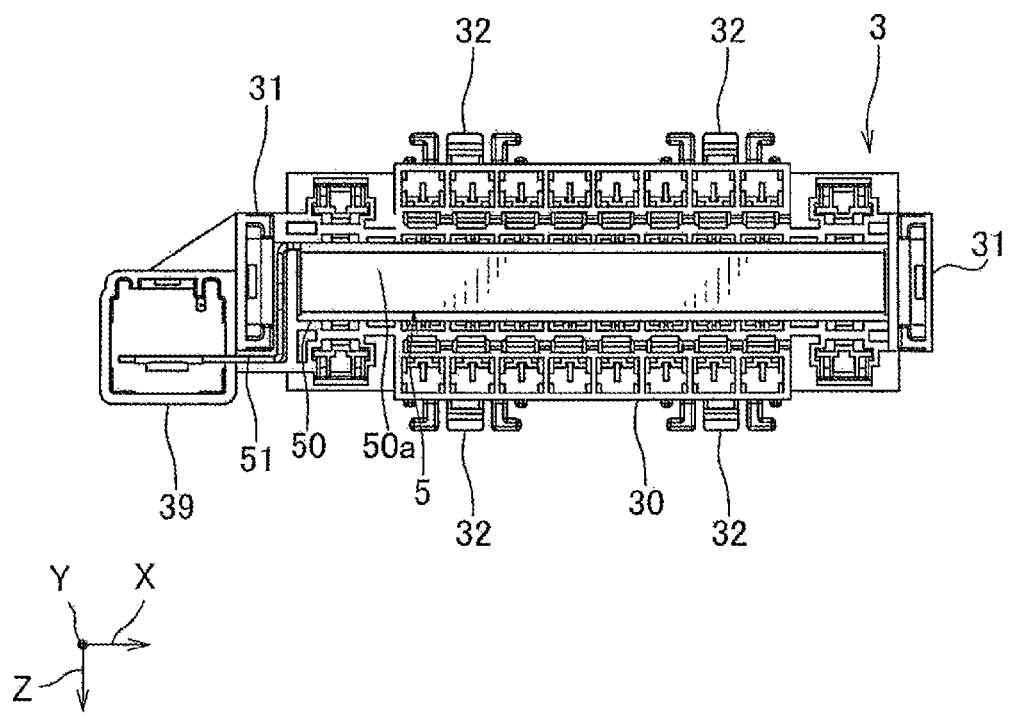
FIG. 7 is a bottom view illustrating the first one of pair of cassette block composing the power source block illustrated in FIG. 1.

The above mentioned bus bar 5, while attached to the cassette block 3 as shown in FIG. 7, has the middle of the base 50 thereof arranged in a perpendicular direction (the arrows X, Z) perpendicular to the component-attaching direction (the arrow Y), and has the plurality of terminals 56, 57 (U-shaped both ends) arranged in the component-attaching direction (the arrow Y). The middle 50a of the base 50 is formed into strip-like shape extending in the arrow X direction. The base 50 opposes the micro relay 8 attached to the cassette block 4 in the component-attaching direction (the arrow Y) (refer to FIGS. 2, 3).

Figure 2:
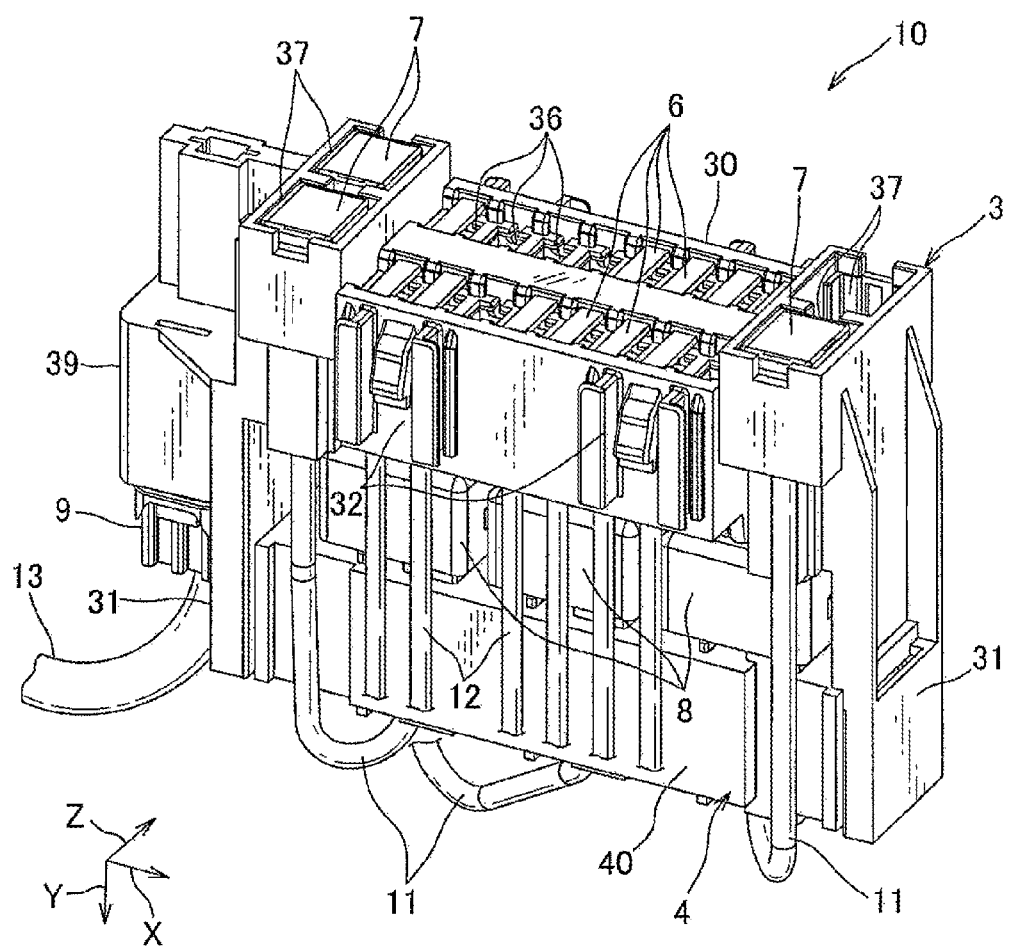
FIG. 2 is a perspective view illustrating a power source block illustrated in FIG. 1.
Figure 3:
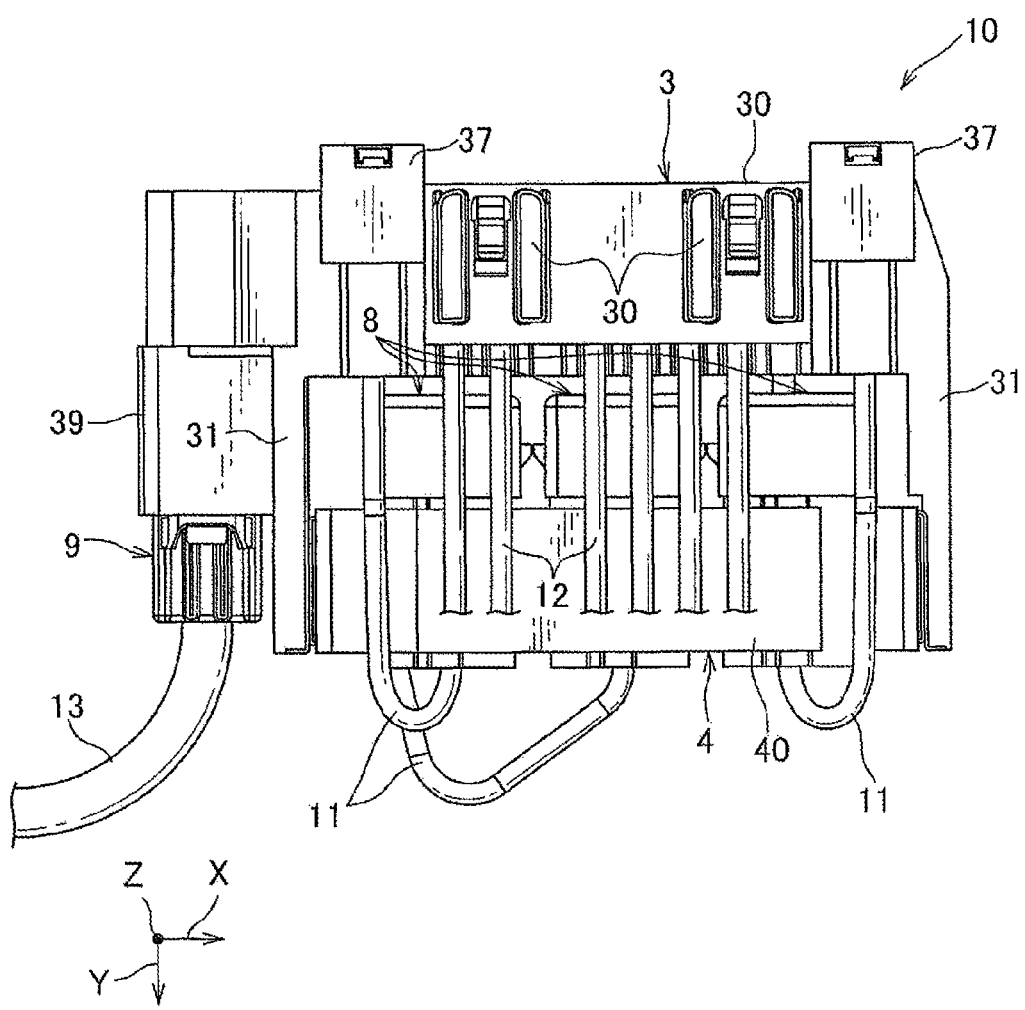
FIG. 3 is a front view illustrating the power source block illustrated in FIG. 1.
Figure 5:
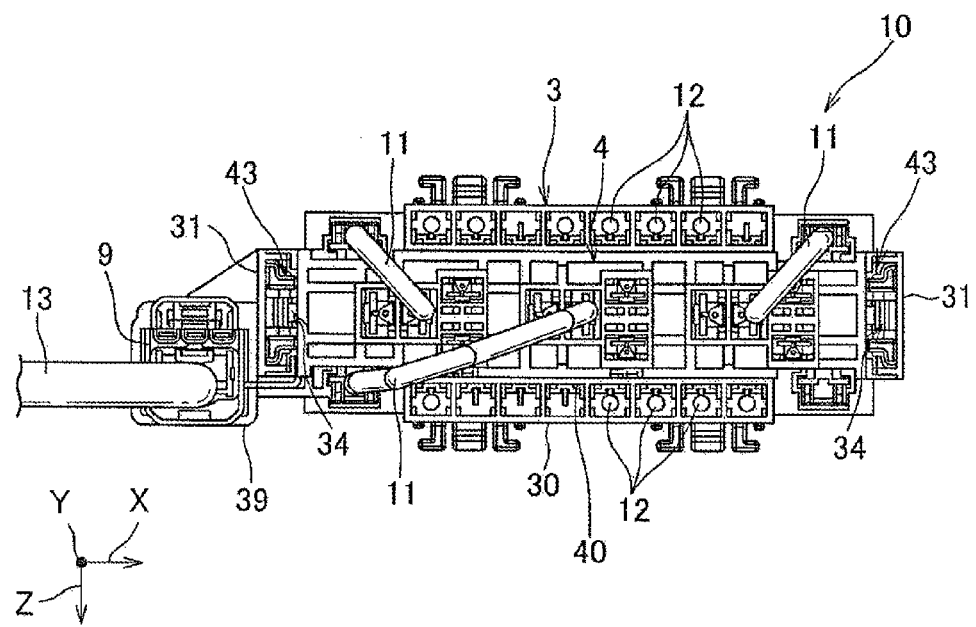
FIG. 5 is a bottom view illustrating the power source block illustrated in FIG. 1.

The above mentioned electric wire 11 as shown in FIGS. 2, 5, and 9, is one that each connects the fuse 7 and the micro relay 8. The electric wire 11 connected to each fuse 7 from bottom side of one of cassette block 3 also is passed at the side of the micro relay 8, connected to each micro relay 8 from the bottom of the other cassette block 3. Namely, the micro relay 8 is connected in series to the fuse 7 through the electric wire 11. The above mentioned electric wire 12 is as shown in FIGS. 2, 5, and 9, is one that is connected to each fuse 6. The electric wire 12 connected to each fuse 6 from the bottom side of the one of cassette block 3 is passed the side of the micro relays 8, and guided out of the case 2. I.e., the electric wires 11, 12 do not oppose the micro relay 8 in the component-attaching direction. It follows from this that the electric wires 11, 12, independently of dimension of interval between the pair of cassette blocks 3, 4, avoid interfering with the micro relay 8.

Thus, according to the invention the electric wire 12 attached to the one cassette block 3 avoids opposing the micro relay 8 in the component-attaching direction that is attached to the other cassette block 4, allowing interval between the pair of cassette blocks 3, 4 to narrow as far as the bus bar 5 and the micro relay 8 avoid interfering with each other. Therefore it is made possible to downsizing the case 2. Furthermore, there is not required a cover that keeps away the electric wire 12.

Furthermore, since it is possible for the fuse 7 attached to the one cassette block 3 and the micro relay 8 attached to the other cassette block 4 to approach to each other, wiring work between the micro relay 8 and the fuse 7 is made easy. Furthermore, the electric wire connecting between the micro relay 8 and the fuse 7 is made short.

The above mentioned power source block 10 has the electric components 6, 7, 8, and the electric wires 11, 12, attached thereto, the pair of cassette blocks 3, 4 is, while attached to each other, inserted into the case main body 2a, the four latches 32 disposed in the one cassette block 3 are each latched in the not-shown latched parts, and consequently the power source block 10 is installed into the case 2a.

According to the invention, no need of installing each of the pair of cassette blocks 3, 4 into the case 2a allows the electric junction box 1 to be assembled easily.

Furthermore, as shown in FIG. 1, the cassette block 3 is arranged near an opening, and the cassette block 4 at the bottom side, of the case main body 2. Such arrangement in the electric junction box 1 allows the fuse 6, 7 to be changed easily only by removing the cover 2b upon their being changed.

Furthermore, while in the above mentioned embodiment the one cassette block 3 has the pair of plates 31 disposed therein, in the present invention the other cassette block 4 may have the pair of plates 31 disposed therein. In addition, the pair of plates 31 is not necessarily disposed, but a latch means may in such case be disposed for attaching each the pair of cassette blocks 3, 4 to the case main body 2a.

Note that the aforementioned embodiments merely show such as, but not limited to, typical embodiment of the present invention. Namely, it is to be understood that various changes and modifications will be apparent to those skilled in the art. Therefore, unless otherwise such changes and modifications depart from the scope of the present invention hereafter defined, they should be construed as being included therein.

REFERENCE SIGNS LIST 1 electric junction box
3, 4 cassette block
5 bus bar
6, 7 fuse (electric component)
8 micro relay (electric component)

The invention claimed is:

1. An electric junction box, comprising:
a pair of cassette blocks configured to attach electric components thereto, arranged at intervals to each other in a component-attaching direction; and
a cross-sectionally U-shaped bus bar attached to one of the pair of cassette blocks, electrically connected to the electric components, and including a middle portion and both ends, wherein the middle portion of the bus bar is arranged in a direction perpendicular to the component-attaching direction, and both ends of the bus bar are arranged in the component-attaching direction, and
wherein the electric components attached to the other of the pair of cassette blocks are opposed to the middle of the bus bar.

2. The electric junction box as claimed in claim 1, wherein the electric components connected to the bus bar in the one of the pair of cassette blocks are arranged in two lines.

3. The electric junction box as claimed in claim 2, further comprising a plate disposed in the one or the other of the pair of cassette blocks, wherein the plate extends toward the other or the one of the pair of cassette blocks, and is provided with an engaging part for being engaged by the other or the one of the pair of cassette blocks.

4. The electric junction box as claimed in claim 3, wherein the one of the pair of cassette blocks is configured to attach a fuse thereto, wherein the other of the pair of cassette blocks is configured to attach a relay thereto, and wherein the relay is connected in series to the fuse.

5. The electric junction box as claimed in claim 2, wherein the one of the pair of cassette blocks is configured to attach a fuse thereto, wherein the other of the pair of cassette blocks is configured to attach a relay thereto, and wherein the relay is connected in series to the fuse.

6. The electric junction box as claimed in claim 1, further comprising a plate disposed in the one or the other of the pair of cassette blocks, wherein the plate extends toward the other or the one of the pair of cassette blocks, and is provided with an engaging part for being engaged by the other or the one of the pair of cassette blocks.

7. The electric junction box as claimed in claim 6, wherein the one of the pair of cassette blocks is configured to attach a fuse thereto, wherein the other of the pair of cassette blocks is configured to attach a relay thereto, and wherein the relay is connected in series to the fuse.

8. The electric junction box as claimed in claim 1, wherein the one of the pair of cassette blocks is configured to attach a fuse thereto, wherein the other of the pair of cassette blocks is configured to attach a relay thereto, and wherein the relay is connected in series to the fuse.

* * * * *